July 11, 1961
LE ROY McDONNOLD
2,992,315
DOMESTIC APPLIANCE
Filed March 20, 1959
3 Sheets-Sheet 2
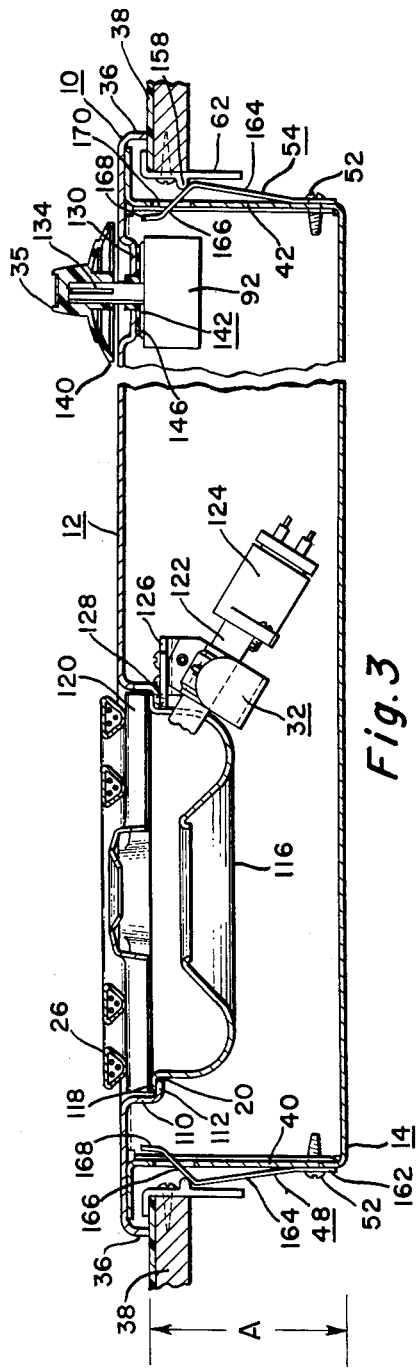
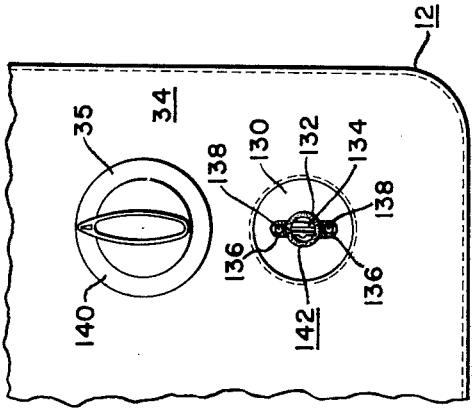
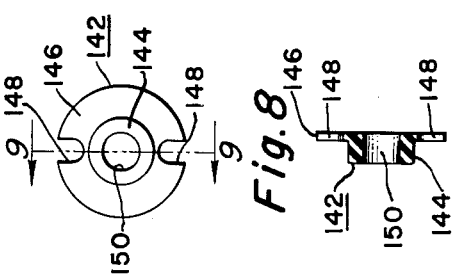
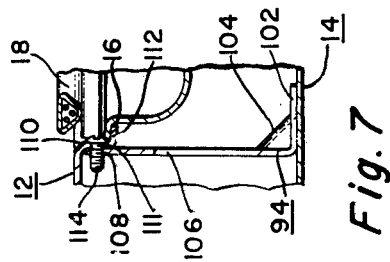
INVENTOR.
LeRoy McDonnold
BY
*Frederick M. Ritchie*
His Attorney

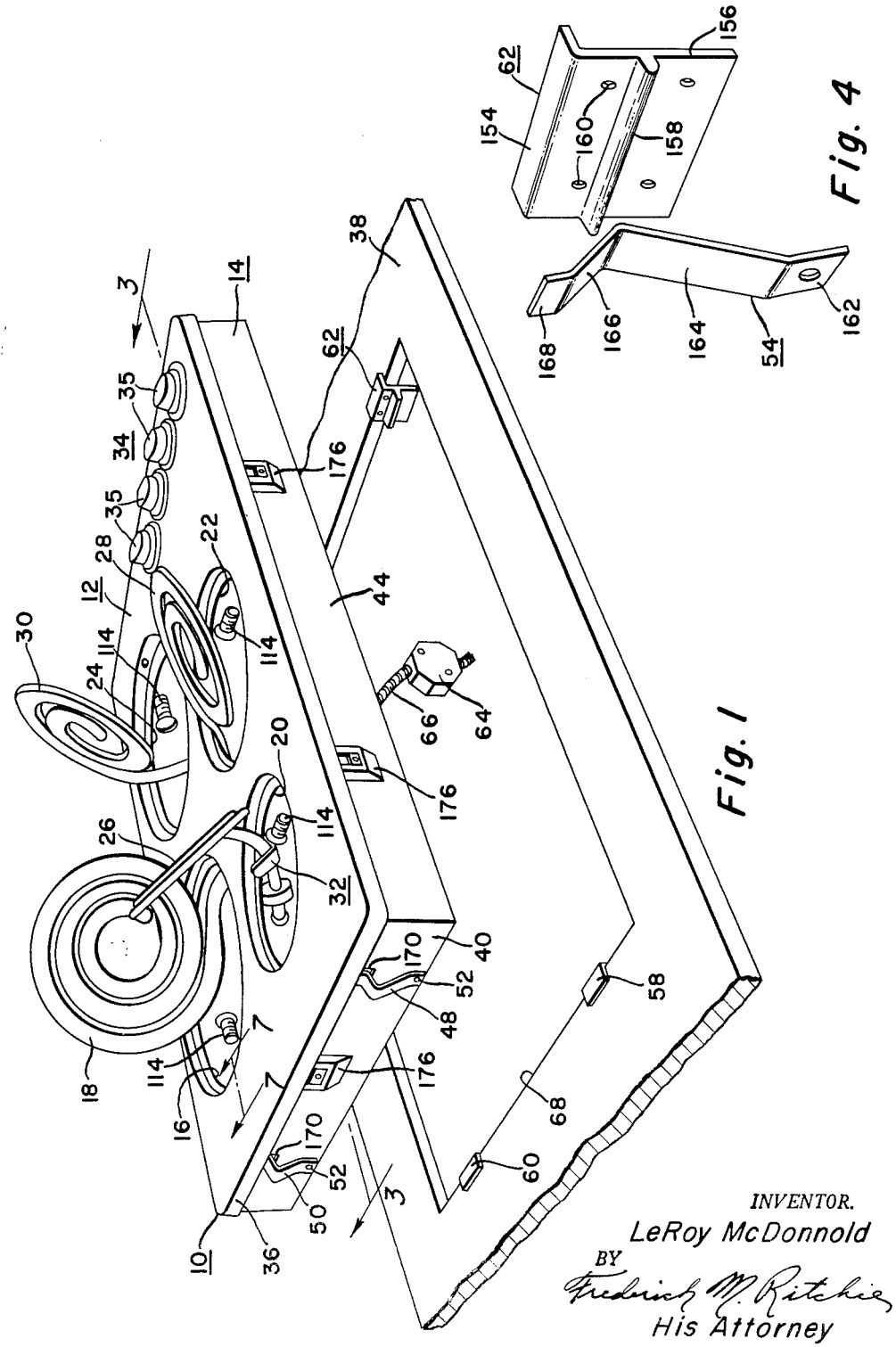

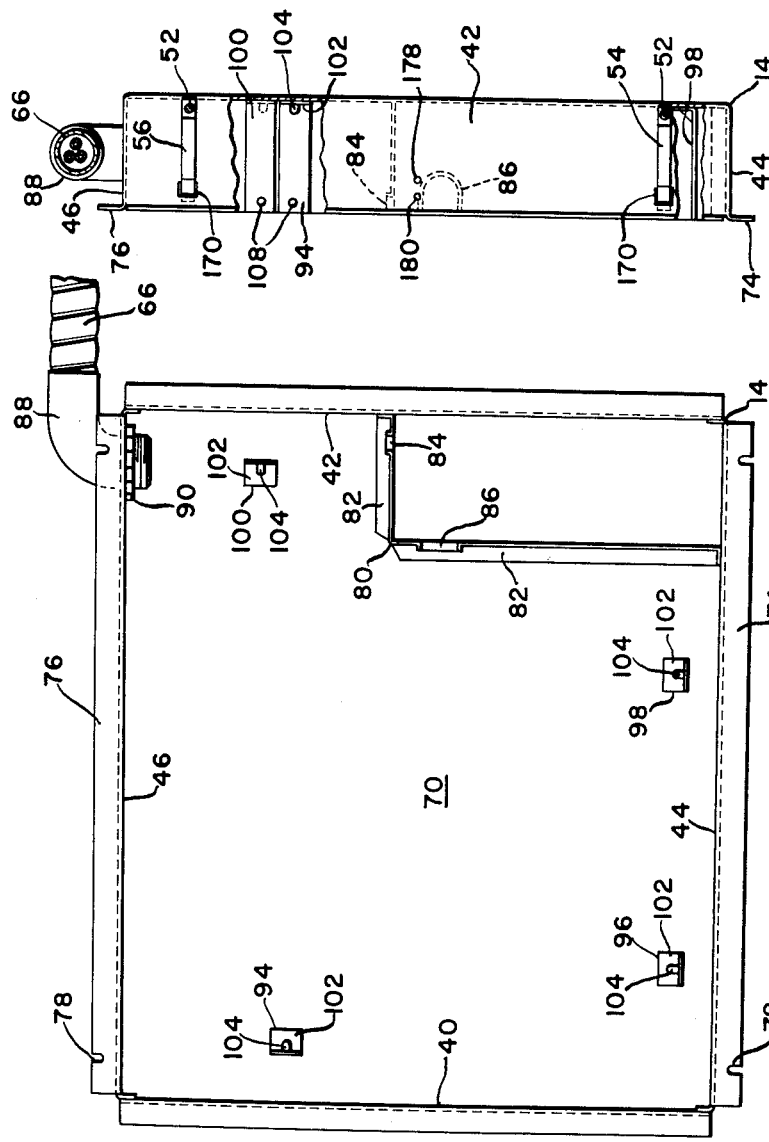

United States Patent Office 2,992,315
Patented July 11, 1961

2,992,315
DOMESTIC APPLIANCE
Le Roy McDonnold, West Carrollton, Ohio, assignor to General Motors Corporation, Detroit, Mich., a corporation of Delaware
Filed Mar. 20, 1959, Ser. No. 800,879
3 Claims. (Cl. 219—37)

This invention relates to a domestic appliance and more particularly to a snap-in cooking top.

With the trend toward built-in appliances it has become necessary to perfect designs which will facilitate rapid and economical installations. In addition, the cooking top should provide controls which are easily accessible and should be designed with minimum depth below the top surface of the cooking top. In this way the design of the supporting cabinet need not be materially altered and the top drawer space thereof just below the cooking unit may be utilized.

Accordingly it is an object of this invention to provide a cooking top which will install easily in standard 24-inch cabinets.

Another object of this invention is to provide a cooking top which is adapted for snap-in installation.

Another object of this invention is to provide a cooking top with a minimum below-counter top depth.

Still another object of this invention is to provide a cooking top which may be completely assembled during manufacture thereof and which is adapted for simple snap-in installation in a counter-top opening.

A more particular object of this invention is to provide a built-in cooking top having a top cooking surface portion and a bottom housing portion with concealed means, accessible from above, for disassembling one from the other.

It is a still further object of this invention to provide a switch mounting arrangement wherein the switch receptacles are mounted below a recessed portion of the top surface and wherein a seal is utilized between switch receptacle and said recessed portion to effect a dirt-tight seal.

It is a more particular object of this invention to provide a spring clip mounting arrangement for a built-in cooking top wherein a mounting catch portion is fastened to a counter-top opening to cooperate with a double cam surface spring clip yieldably and lockingly retained on said cooking top.

Further objects and advantages of the present invention will be apparent from the following description, reference being had to the accompanying drawings, wherein a preferred embodiment of the present invention is clearly shown.

In the drawings:

FIGURE 1 is a fragmentary exploded perspective showing the snap-in installation feature of this invention;

FIGURE 2 is a fragmentary plan view of the control area of the cooking top with one of the switch knobs removed to show the mounting arrangement for the switch receptacle to the cooking top;

FIGURE 3 is a fragmentary sectional view taken along line 3—3 of FIGURE 1 showing the snap-in installation and dirt-tight switch receptacle mounting;

FIGURE 4 is a perspective view of the spring clip and mounting catch utilized in the snap-in feature of this invention;

FIGURE 5 is a top plan view of the cooking unit housing portion showing the means for concealably attaching the exposed cooking unit support portion to the housing portion;

FIGURE 6 is a side elevational view of the cooking unit housing portion with parts broken away to show the cooking unit support portion tie-down brackets and the spring clip mounting arrangement;

FIGURE 7 is a fragmentary sectional view taken along line 7—7 of FIGURE 1 showing the means for mounting the cooking unit support portion to the cooking unit housing portion;

FIGURE 8 is a top plan view of the cooking unit switch seal; and

FIGURE 9 is a side sectional view of the cooking unit switch seal taken along line 9—9 in FIGURE 8.

In accordance with this invention and with reference to FIGURE 1 a simplified built-in cooking top 10 is illustrated exploded from its installed position. The cooking top assembly 10 is comprised of a cooking unit support or surface portion 12 and a cooking unit housing portion 14. The cooking unit support portion has a large opening 16 for receiving an 8-inch cooking unit 18 and three smaller openings 20, 22, 24 of the same size for receiving 6-inch cooking units 26, 28 and 30. The cooking units 18, 26, 28 and 30 are pivotally mounted to the underside of the cooking unit support portion 12 as by a snap acting mounting bracket 32. For additional details on the construction of the snap acting bracket 32 reference may be had to a copending application to Bremer S.N. 712,991 filed February 3, 1958, now Patent #2,948,801. Suffice it for this application to recite merely the pivotal action of the cooking units 18, 26, 28 and 30 to the cooking unit support portion 12 of the drop-in cooking top 10. At one corner of the cooking unit support portion 12 is located the controls shown generally at 34 for the cooking units 18, 26, 28 and 30. A peripheral edge flange 36 is down-turned at substantially a right angle to the top surface and circumscribes the cooking unit support portion 12 to abut tightly with a counter-top 38 when the cooking top 10 is snap fastened to the counter-top.

Accommodating the snap-in installation feature of this invention the cooking unit housing portion 14 is formed with end walls 40, 42 and side walls 44, 46. On the end wall 40 are located identical spring clips 48, 50 fastened as by screws 52 to the end wall 40. Identical spring clips 54, 56 are carried on the end wall 42 of the cooking unit housing portion 14. Cooperating with the spring clip 48 is a mounting catch 58, with the spring clip 50 a mounting catch 60, with the spring clip 54 a mounting catch 62, and with the spring clip 56 a mounting catch (not shown) identical to the three just enumerated.

Electrical power is carried from any conventional residential source through a receptacle box 64 and a cable 66 to the cooking units 18, 26, 28 and 30. Thus after electrical connections are completed at the receptacle box 64 the cooking top 10 is simply dropped into an opening 68 in the counter-top 38 and the installation is completed.

The cooking unit housing portion 14 (FIG. 5) is comprised of a bottom wall 70, side walls 44, 46 and end walls 40, 42 fastened together as by a spot welding process. Thus an open top box-like receptacle is formed wherein the electrical leads and switch receptacle boxes may reside in concealed relationship to the operator using the cooking top 10. For strength and to serve as an alternative mounting arrangement the top edges of side walls 44 and 46 are turned over to form flanges 74, 76. Each of the flanges 74, 76 carry slots 78 which may receive any suitable fastening means to attach the housing portion 14 to the counter-top 38 if desired. It should be noted however that this alternative installation negatives the snap-out feature of this invention. Within the cooking unit housing portion 14 is a switch receptacle shield 80 having flanges 82 along the bottom edge thereof for attaching, as by spot welding, the shield 80 to the bottom wall 70 of the housing 14. A switch wiring inlet opening 84 and a switch wiring outlet opening 86 serve to accommodate wiring entering through a wire connector 88 secured as by a nut 90 to the rear side wall 46 of the housing 14. Elbow connector 88 retains also the supply cable 66 thus effecting a conduit for the power source inlet wires which are threaded through shield opening 84 for attachment to the switch receptacle units such as 92. The leads from each of the four switch receptacles 92 are carried through shield outlet opening 86 to their respectively controlled cooking unit 18, 26, 28 and 30.

Of particular significance in the simplified assembling and mounting arrangement of this invention is the means for concealably attaching the cooking unit support or surface portion 12 to the housing portion 14. For this purpose, and with reference to FIGURES 5 and 6, four support portion tie-down brackets or tabs 94, 96, 98 and 100 are attached as by welding to the housing bottom 70 and are positioned respectively adjacent the openings 16, 20, 22 and 24 in the cooking unit support portion 12. With reference to FIGURE 7 each tie-down bracket includes a bottom flange 102, a strengthening rib 104, an upright portion or leg 106 having an opening 108 therein. Each of the openings 16, 20, 22, 24, in order to cooperate with the tide-down brackets, are similarly formed. For instance the opening 16 for cooking unit 18 is formed with a depending cylindrical flange 110 terminating in a generally horizontal shoulder 112. Adjacent the opening 108 in the tie-down bracket leg 106 a similar opening or port 111 is formed in the depending flange 110 of the opening 16. Fastening means 114 may simply be inserted through the openings 111 and 108 to secure the cooking unit support portion 12 to the cooking unit housing portion 14. Each fastening means 114, residing on the vertical flange 110 of the openings 16, 20, 22 and 24 is substantially concealed from view and effects thusly a clean uncluttered surface for the support portion 12. To disassemble surface portion 12 from housing portion 14, the cooking units need only to be pivoted upwardly. The fastening means 114, thus exposed, are simply removed to free top and bottom assemblies of the cooking top 10. The manner in which the cooking units are supported within the openings in the cooking unit support portion 12 will now be explained with reference to FIGURE 3. In this view representative cooking unit 26 is shown supported above the opening 20 in the cooking unit support portion 12. As described immediately hereinabove the opening 20, like opening 16, is formed with a depending flange 110 and an integral generally horizontal support flange or shoulder 112. A drip bowl 116 is formed with a pripheral edge flange 118 which is carried on the shoulder 112 of the respective cooking unit openings such as 20. A conventional support spider 120 rests freely on the top of the flange 118 of the drip bowl 116 and serves to support the cooking unit 26 in its operating position. In accordance with the Bremer application cited hereinbefore the cooking units such as 26 are snap actingly supported by a hinge bracket 32 which retains a terminal end portion 122 of a cooking unit such as 26 at a position where it may be connected through its terminal block 124 to the receptacle leads coming through the opening 86 in the switch receptacle shield 80. The hinge bracket 32 may be carried on a support member 126 spot welded as at 128 to a portion of the shoulder 112 at the edge of the cooking unit opening such as 20.

In the design of cooking tops it is highly desirable to effect a construction which will provide the least possible areas for collecting dirt. In the cooking top of this invention the control section 34 includes knobs 35 which are installed at one corner of the cooking unit support portion 12. Each switch receptacle such as 92 (see FIGURE 3) is installed beneath a recessed portion 130 in the cooking unit support portion or top surface 12. FIGURE 2 shows a fragmentary portion of the top surface 12 wherein one of the knobs 35 has been removed to expose the recessed portion 130 as having an irregularly shaped opening 132 for permitting the switch receptacle shaft 134 to extend upwardly therethrough. The opening 132 has extension slots 136 at opposite sides thereof which overlie tapped openings 138 in the switch receptacle such as 92 for receiving any conventional fastening means to hold the switch receptacle 92 in affixed relationship to the cooking top surface 12. The recessed portion 130 cooperates with an outwardly extending flange 140 of the control knobs 35. The overlying relationship of the knob flange 140 resists the entrance of dirt particles into the recessed area 130 beneath the control knobs 35.

To further enhance the dirt resisting feature of this invention a rubber surface unit switch seal 142 is utilized (FIGURES 8 and 9). The seal 142 includes an upstanding cylindrical portion 144 and a generally horizontal bottom flange 146 having slots 148 therein which are complementary with slots 136 in the recessed opening 132 to facilitate entrance of the fastening means to the tapped openings 138 of the switch receptacle 92. The seal 142 is formed with a central opening 150 through which the shaft 134 of the switch may extend upwardly into engaging position with the control knob 35. When the fastening means which insert in openings 138 of the switch receptacle 92 are tightened the bottom flange 146 of the seal 142 is sandwiched between the underside of the recessed portion 130 and the switch receptacle 92, thereby providing a dirt-tight seal for the switch receptacle 92.

The snap-in snap-out installation feature of this invention is facilitated through the use of a snap-in spring clip such as 54 and a mounting catch bracket such as 62. These two elements are shown in exploded perspective relationship in FIGURE 4. The mounting catch bracket 62, for example, is formed with a top support ledge or shoulder 154, a depending counter-top opening edge flange 156 and a protruding rib 158. Several fastener holes such as 160 are formed in the catch bracket 62 for securing the bracket to the opening 68 in the counter-top 38. The cooperating element, spring clip 54 is formed with an attachment portion 162, a lower cam portion 164, an upper cam portion 166 and a clip retention or lock portion 168. With the cooking top 10 in installed relationship, as seen in FIGURE 3, the retention portion 168 of the spring clip 54 extends through an opening such as 170 in the side wall 42 of the cooking unit housing portion 14. This extension 168 engages the top edge of the opening 170 to prevent the spring clip from pulling outwardly away from the end wall 42 of the housing 14, but does not restrict the spring action of the clip 54 when it is fastened as at 52 to the housing wall 42. Note in FIGURE 3 that the protuberance or rib 158 of the mounting catch 62 resides on the upper cam surface 166 of the spring clip 54 when the downturned flange 36 of the surface portion 12 is in engagement with the counter-top 38. In this manner a continuous downward bias is placed on the cooking top 10 to urge its peripheral flange 36 into tight sealing engagement with the counter-top 38. As the cooking top 10 is being dropped into installed position the rib 158 of the catch bracket such as 62 cams the spring clip 54 inwardly on the lower cam surface 164 of the clip 54 until the cooking top is installed and the rib 158 resides intermediate the ends of the upper cam surface 166. The other three spring clips 50, 52 and 56 operate in exactly the same manner as described in connection with the spring clip 54—the four snap-in elements providing a secure but simple installation for the cooking top 10.

In accordance with UL requirements a plurality of ceramic spacer blocks 176 are fastened through openings 178 to the vertical wall portions of the housing 14 to retain the housing walls 40, 42, 44, 46 in spaced relationship to the counter-top opening 68 (FIGURES 1 and 6). An additional port 180 is formed in the side walls from that required to attach the ceramic blocks 176 so that a third method of attaching the cooking unit 10 is facilitated. In this manner fastening means (not shown) may be inserted through the vertical walls of the housing 14, through the ceramic spacer blocks 176 and into the vertical edge portion of the opening 68. Here, as was explained in connection with the second alternative installation method using housing flange slots 78, the snap-out feature is negatived.

It should now be seen that a simplified cooking top 10 has been designed wherein a minimum top to bottom depth A of only 3⅜" is created and wherein a simplified snap-in feature permits quick efficient installation of the cooking top in a matter of minutes. The cooking top 10 is completely factory preassembled and thus assembly work is eliminated in the field. Further, simplified and concealed means are taught for attaching the top support or surface portion 12 to a housing portion 14, whereby a solid assembly is effected and ease of servicing is enhanced.

While the form of embodiment of the invention as herein disclosed constitutes a preferred form, it is to be understood that other forms might be adopted, as may come within the scope of the claims which follow.

What is claimed is as follows:

1. A drop-in cooking top for a counter having an opening comprising, a cooking unit support portion and a cooking unit housing portion, said support portion having a substantially flat top surface, a cooking unit opening, a switch shaft opening recessed from said top surface, and a downturned peripheral edge flange, said cooking unit opening being defined by a flange depending from said top surface and terminating in a generally horizontal shoulder, a flanged drip bowl supported on said shoulder, a cooking unit support spider freely supported on said drip bowl flange, a cooking unit pivotally connected to said shoulder and supported by said spider, a switch shaft extending upwardly through said shaft opening and having a shaft seal, said housing portion having a bottom wall, an end wall and a side wall, a top surface tie-down bracket attached to said bottom wall and extending upwardly to a position adjacent said cooking unit opening flange, means for fastening said bracket to said cooking unit opening flange, a spring clip on said end wall having upper and lower cam portions and means for attaching said clip to said end wall, said end wall having a port for restrictingly receiving said upper cam portion, and a mounting catch bracket attached to said counter opening and having a rib adjacent said cam portions for retaining said peripheral edge flange in opposed biasing relationship to said counter.

2. A drop-in cooking top for a counter having an opening comprising, a cooking unit support portion and a cooking unit housing portion, said support portion having a cooking unit opening, and a downturned peripheral edge flange, said cooking unit opening being defined by a depending flange, said housing portion having a bottom wall and an end wall, a top surface tie-down bracket attached to said bottom wall and extending upwardly to a position adjacent said depending flange, means for fastening said bracket to said depending flange, a spring clip on one of said walls having upper and lower cam portions, said one of said walls having a port for restrainingly receiving said upper cam portion, and a mounting catch bracket attached to said counter opening and having a protuberance adjacent said cam portions for retaining said peripheral edge flange in opposed biasing relationship to said counter.

3. A drop-in cooking top for a counter having an opening comprising, a cooking unit support portion and a cooking unit housing portion, said support portion having a cooking unit opening, and a peripheral edge flange, said cooking unit opening being defined by a depending flange, said housing portion having a bottom wall and an end wall, a top surface tie-down bracket attached to said bottom wall and extending upwardly to a position adjacent said depending flange, means for fastening said bracket to said depending flange, a spring clip on one of said walls having upper and lower cam portions, said one of said walls having a port for restrainingly receiving said upper cam portion, and a mounting catch bracket attached to said counter opening and having a protuberance adjacent said cam portions for retaining said peripheral edge flange in opposed biasing relationship to said counter.

References Cited in the file of this patent

UNITED STATES PATENTS

| Number | Name | Date |
| --- | --- | --- |
| 380,933 | Roberts | Apr. 10, 1888 |
| 1,945,348 | Farr | Jan. 30, 1934 |
| 1,998,672 | Hammond | Apr. 23, 1935 |
| 2,551,759 | Pence | May 8, 1951 |
| 2,565,636 | Tinnerman | Aug. 28, 1951 |
| 2,576,683 | Horn | Nov. 27, 1951 |
| 2,831,955 | Sheidler | Apr. 22, 1958 |
| 2,868,604 | Gibson et al. | Jan. 13, 1959 |